United States Patent
Tan et al.

(10) Patent No.: US 8,943,065 B2
(45) Date of Patent: Jan. 27, 2015

(54) CATALOG PERFORMANCE AND INTEGRITY ANALYSIS

(75) Inventors: Karlay Tan, Foster City, CA (US); Lee-Hian Quek, Foster City, CA (US); Marc Cagigas, Castro Valley, CA (US); Sudhir Subramanian, Redwood City, CA (US); Margaret Lloyd, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/478,826

(22) Filed: May 23, 2012

(65) Prior Publication Data

US 2013/0318089 A1     Nov. 28, 2013

(51) Int. Cl.
*G06F 17/30* (2006.01)
*G06Q 30/06* (2012.01)

(52) U.S. Cl.
CPC ......... *G06Q 30/0603* (2013.01); *Y10S 707/948* (2013.01)
USPC ........... 707/740; 707/610; 707/769; 707/948; 707/E17.014; 705/7.11; 705/26.1; 705/27.1; 705/343

(58) Field of Classification Search
CPC .............. G06F 17/30; G06F 17/30424; G06F 17/3053; G06F 12/0866; G06F 12/0813; G06F 17/30949; G06Q 10/087; G06Q 30/0603; G06Q 30/0633; G06Q 30/0639; G06Q 30/00; G06Q 30/0275; G06Q 30/0601; G06Q 30/0637; G06Q 30/0627
USPC .................... 707/740, 948, E17.14, E17.018, 707/E17.044, 610, 769, 768, 759, 765, 707/E17.014, E17.005, E17.069, E17.092; 705/27, 27.1, 80, 7.34, 26.1, 26.81, 705/14.16, 343, FOR. 109, 7.11, 26, 27.8; 715/229, 738; 709/203, 217
See application file for complete search history.

(56) References Cited

U.S. PATENT DOCUMENTS 5,201,048 A * 4/1993 Coulter et al. ........ 707/E17.005
5,319,542 A    6/1994 King, Jr. et al.
(Continued)

FOREIGN PATENT DOCUMENTS

JP     2008262406 A    10/2008

OTHER PUBLICATIONS

Sven Döring, Werner Kießling, Timotheus Preisinger and Stefan Fischer—"Evaluation and optimization of the catalog search process of e-procurement platforms"—Electronic Commerce Research and Applications—International Workshop on Data Engineering Issues in E-Commerce—vol. 5, Issue 1, Spring 2006, pp. 44-56.*

(Continued)

*Primary Examiner* — Anh Ly
(74) *Attorney, Agent, or Firm* — Kilpatrick Townsend & Stockton LL (57) ABSTRACT

Embodiments of the invention provide systems and methods for managing catalog information that can include tracking and reporting search terms used for catalog items searches. According to one embodiment, a procurement application can maintain a log of unique search phrases which returned no search results. For example, the log can maintain records from a specific time period. A count can be maintained to capture how many times a phrase was used for search within the specific time period, and used to rank the frequency of the search phrases. Search phrases that exceed that time period may be purged. The accumulated counts and associated search terms can be provided to the managers periodically and/or upon request in the form of a summary or other graphical and/or textual report or presentation.

9 Claims, 7 Drawing Sheets

(56) References Cited

U.S. PATENT DOCUMENTS

| | | | | |
|---|---|---|---|---|
| 5,835,896 | A * | 11/1998 | Fisher et al. | 705/37 |
| 5,861,906 | A * | 1/1999 | Dunn et al. | 725/87 |
| 5,913,215 | A * | 6/1999 | Rubinstein et al. | 707/708 |
| 6,003,006 | A * | 12/1999 | Colella et al. | 705/2 |
| 6,023,683 | A | 2/2000 | Johnson et al. | |
| 6,032,130 | A | 2/2000 | Alloul et al. | |
| 6,292,894 | B1 | 9/2001 | Chipman et al. | |
| 6,324,534 | B1 | 11/2001 | Neal et al. | |
| 6,373,012 | B1 * | 4/2002 | Crutchfield et al. | 707/999.2 |
| 6,564,213 | B1 * | 5/2003 | Ortega et al. | 707/E17.074 |
| 6,606,603 | B1 | 8/2003 | Joseph et al. | |
| 6,785,671 | B1 * | 8/2004 | Bailey et al. | 705/26.81 |
| 6,917,933 | B2 | 7/2005 | Craig et al. | |
| 7,035,817 | B1 | 4/2006 | Brothers | |
| 7,039,645 | B1 | 5/2006 | Neal et al. | |
| 7,113,920 | B1 | 9/2006 | Brisiel et al. | |
| 7,139,769 | B2 | 11/2006 | Ouchi | |
| 7,302,405 | B2 | 11/2007 | Hoskin et al. | |
| 7,734,506 | B2 | 6/2010 | Ouchi | |
| 7,752,238 | B2 | 7/2010 | Wilmsen et al. | |
| 7,870,038 | B1 | 1/2011 | Hammond et al. | |
| 8,073,861 | B2 * | 12/2011 | Cundiff et al. | 707/768 |
| 8,249,885 | B2 * | 8/2012 | Berkowitz et al. | 705/1.1 |
| 8,364,695 | B2 * | 1/2013 | Berkowitz et al. | 707/768 |
| 8,666,903 | B2 | 3/2014 | Cirulli et al. | |
| 2001/0051980 | A1 * | 12/2001 | Raciborski et al. | 709/203 |
| 2002/0052801 | A1 | 5/2002 | Norton et al. | |
| 2002/0052925 | A1 * | 5/2002 | Kim et al. | 709/217 |
| 2002/0083062 | A1 * | 6/2002 | Neal et al. | 707/10 |
| 2002/0111879 | A1 * | 8/2002 | Melero et al. | 705/26 |
| 2002/0111895 | A1 | 8/2002 | Blair | |
| 2003/0028451 | A1 | 2/2003 | Ananian | |
| 2003/0061122 | A1 * | 3/2003 | Berkowitz et al. | 705/27 |
| 2003/0074362 | A1 | 4/2003 | Craig et al. | |
| 2004/0039735 | A1 * | 2/2004 | Ross et al. | 707/3 |
| 2004/0103042 | A1 * | 5/2004 | Ryu et al. | 705/26 |
| 2004/0162763 | A1 | 8/2004 | Hoskin et al. | |
| 2005/0076017 | A1 * | 4/2005 | Rein et al. | 707/3 |
| 2006/0206355 | A1 * | 9/2006 | Cheung et al. | 705/1 |
| 2008/0134048 | A1 * | 6/2008 | Leibow et al. | 715/738 |
| 2008/0221915 | A1 * | 9/2008 | Berkowitz et al. | 705/1 |
| 2009/0132601 | A1 * | 5/2009 | Cundiff et al. | 707/200 |
| 2009/0216545 | A1 * | 8/2009 | Rajkumar et al. | 705/1 |
| 2009/0299781 | A1 | 12/2009 | Dattathreya | |
| 2009/0299991 | A1 * | 12/2009 | Zarzar Charur et al. | 707/5 |
| 2010/0191616 | A1 | 7/2010 | Berkowitz et al. | |
| 2010/0299268 | A1 * | 11/2010 | Guha et al. | 705/80 |
| 2011/0004534 | A1 | 1/2011 | Venkiteswaran | |
| 2011/0066455 | A1 * | 3/2011 | Lobo et al. | 705/7 |
| 2011/0078046 | A1 * | 3/2011 | Tan et al. | 705/27.1 |
| 2011/0087626 | A1 | 4/2011 | Yeleshwarapu et al. | |
| 2012/0191717 | A1 * | 7/2012 | Chen et al. | 707/740 |
| 2012/0241526 | A1 * | 9/2012 | Kaar et al. | 235/87 R |
| 2012/0265744 | A1 * | 10/2012 | Berkowitz et al. | 707/705 |
| 2013/0317869 | A1 | 11/2013 | Tan et al. | |

OTHER PUBLICATIONS

Conan C. Albrecht, Douglas L. Dean, and James V. Hansen—"Marketplace and technology standards for B2B e-commerce: progress, challenges, and the state of the art"—Information & Management—vol. 42, Issue 6, Sep. 2005, pp. 865-875.*

ATG.com, "ATG Search Version 10.0.1, Administration Guide," retrieved from http://www.atg.com/repositories/ContentCatalogRepository_en/manuals/Search10.0.1/pdf/ATGSearch Admin.pdf on Sep. 14, 2011, 247 pages.

Intelligenx, "Insight Analytics, Realize the full value of your site by giving users a search experience they love, so they keep coming back," retrieved on Aug. 25, 2011 from http://www.intelligenx.com/local-search/insight-analytics, 2 pages.

MemberGate, "Search Phase Report," MemberGate has the features you want, retrieved on Jul. 26, 2012 from http://www.membergate.com/public/76.cfm#spr, 2011, 5 pages.

Microsoft Corporation, "Microsoft SharePoint 2010, Planning guide for sites and solutions for Microsoft SharePoint Server 2010, Part 2," retrieved from http://www.microsoft.com/en-us/download/details.aspx?id=23613 on Jul. 26, 2012, 450 pages.

Zurburg, B., "Creating the Intranet Search Experience," BasZurburg.com, retrieved on Aug. 26, 2011 from http://www.baszurburg.com/post/2010/09/20/creating-intranet-search-experience.aspx, Sep. 2010, 6 pages.

Author Unknown, "ProcServe: Supplier PunchOut Guide," ProcServe, 2010, 14 pages.

U.S. Appl. No. 13/478,905, Non-Final Office Action mailed on Sep. 16, 2014, 12 pages.

* cited by examiner

CATALOG PERFORMANCE AND INTEGRITY ANALYSIS

BACKGROUND OF THE INVENTION

Embodiments of the present invention relate generally to methods and systems for managing catalog information in a procurement system and more particularly to tracking and reporting search terms used for catalog items searches for managing performance and integrity of catalog information.

Given the large number of products and services that can be requested via an Enterprise Procurement Requisitioning application, it is challenging for the catalog managers to ensure that the content available via catalog search or catalog browse functions can be easily located by the requesters. Catalog managers also face the challenge of ensuring that the catalog content stays relevant and current as products and services change and the needs of the requesters evolve. By understanding what requesters are searching for, the catalog administrators can better manage their catalog content and also reduce overhead in managing non-catalog requests and support calls as a result of requesters not locating their desired products and services.

Currently, there is no easy way for the catalog managers to have a consolidated view of what requesters are searching for, especially for products and services that they could not find when submitting a request. Rather, managers manually review non-catalog requests or support tickets, which may not always be indicative of what requesters are searching for. Hence, there is a need for improved methods and systems for tracking and reporting search terms used for catalog items searches.

BRIEF SUMMARY OF THE INVENTION

Embodiments of the invention provide systems and methods for managing catalog information that can include tracking and reporting search terms used for catalog items searches for managing performance and integrity of catalog information. According to one embodiment, managing performance and integrity of catalog information can comprise searching the index of the externally hosted catalog and/or the one or more internal records. Managing performance and integrity of catalog information can further comprises determining whether one or more results of said search are found. In response to determining if one or more results of said searching are not found, a further determination can be made as to whether terms for said searching (i.e., the failed search terms) are unique relative to a list of failed previous search terms. In response to determining the failed search terms are not unique relative to the list of failed previous search terms, a count can be incremented for an entry in the list of failed previous search terms matching the terms for said searching. In response to determining the terms for said searching are unique relative to the list of failed previous search terms, the terms for said searching can be added to the list of failed previous search terms.

In some cases, the list of failed previous search terms can be ranked based on the count of each entry of the list. The list of failed previous search terms can be presented to an administrator or other user. The presented list can be ordered, for example, based on said ranking. In some cases, one or more entries of the list of failed previous search terms can be expired based on a pre-determined time period or otherwise periodically cleaned or purged.

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Embodiments of the invention provide systems and methods for managing catalog information that can include onsite as well as externally hosted product or service information. Generally speaking, customers can create externally hosted catalogs for each supplier, and set up high level keywords so that a link to the externally hosted catalog information can be returned if requesters execute a search using these keywords. The source of where the product or service comes from does not result in issues for the requesters when trying to locate an item. Rather, the enterprise procurement application can guide the requesters to the items they are looking for regardless of the source.

Embodiments of the present invention provide for allowing catalog managers to upload externally hosted catalog item level details, such as item description, manufacturer and manufacturer part number to an externally hosted catalog and/or an index thereof. This item level information can be stored in a search index, which will allow procurement application requesters to search against individual items that reside in externally hosted catalogs without having to navigate to the external site first. Requesters can perform one search query against products and services from both local and external sources. If the search query matches items from the externally hosted catalog search index, links to the externally hosted catalog search items can be returned in the search results together with the content from the internal sources. Requester can see that the item he is looking for is on an externally hosted catalog, and can then access the externally hosted catalog to complete the requisition creation. In some cases, before going to the external catalog, the items can be evaluated more thoroughly using requester analytics and compare functionality. Various additional details of embodiments of the present invention will be described below with reference to the figures.

Figure 1:
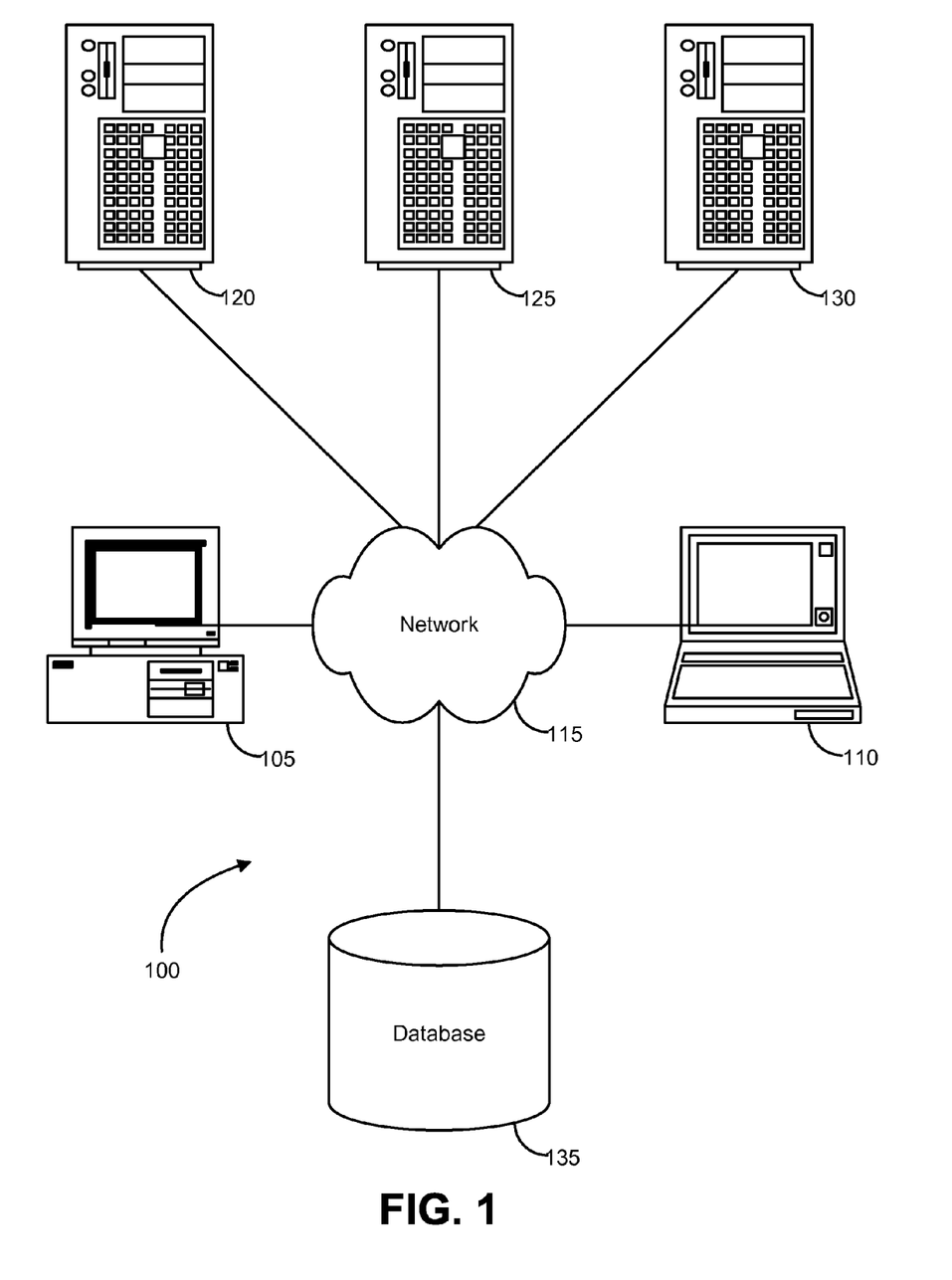
FIG. 1 is a block diagram illustrating components of an exemplary operating environment in which various embodiments of the present invention may be implemented.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10 g, that is adapted to store, update, and retrieve data in response to SQL-formatted commands.

Figure 2:
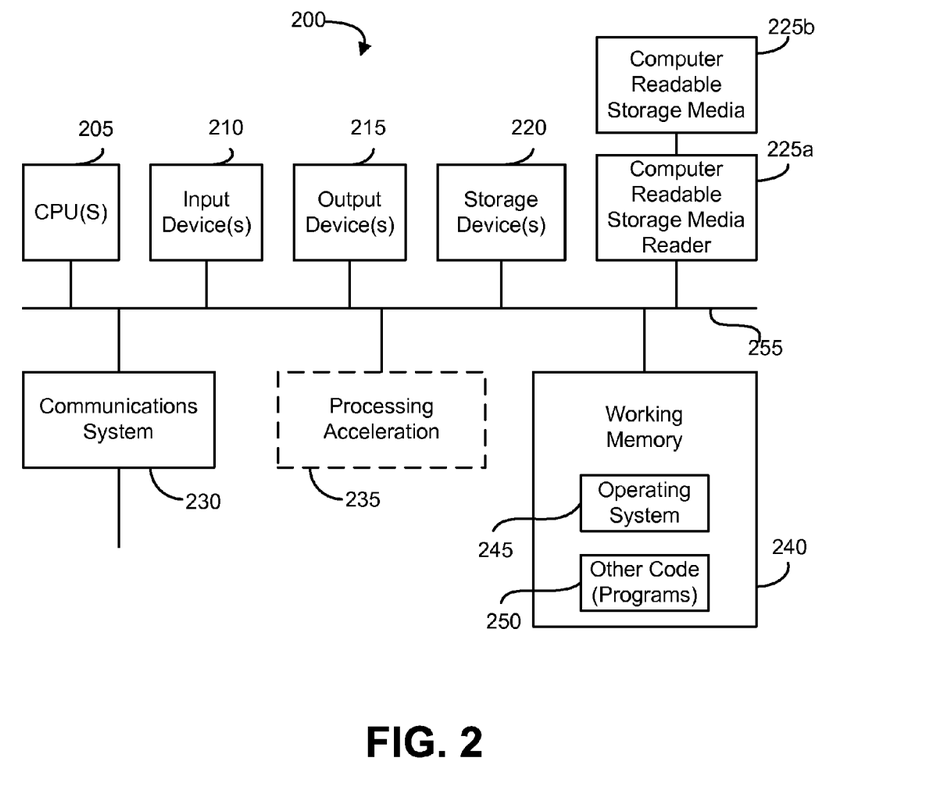
FIG. 2 is a block diagram illustrating an exemplary computer system in which embodiments of the present invention may be implemented.

FIG. 2 illustrates an exemplary computer system 200, in which various embodiments of the present invention may be implemented. The system 200 may be used to implement any of the computer systems described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage device 220. By way of example, storage device(s) 220 may be disk drives, optical storage devices, solid-state storage device such as a random access memory ("RAM") and/or a read-only memory ("ROM"), which can be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which can include a DSP, a special-purpose processor and/or the like.

The computer-readable storage media reader 225a can further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 220 and/or any other computer described above with respect to the system 200.

The computer system 200 may also comprise software elements, shown as being currently located within a working memory 240, including an operating system 245 and/or other code 250, such as an application program (which may be a client application, web browser, mid-tier application, RDBMS, etc.). It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed. Software of computer system 200 may include code 250 for implementing embodiments of the present invention as described herein.

Figure 3:
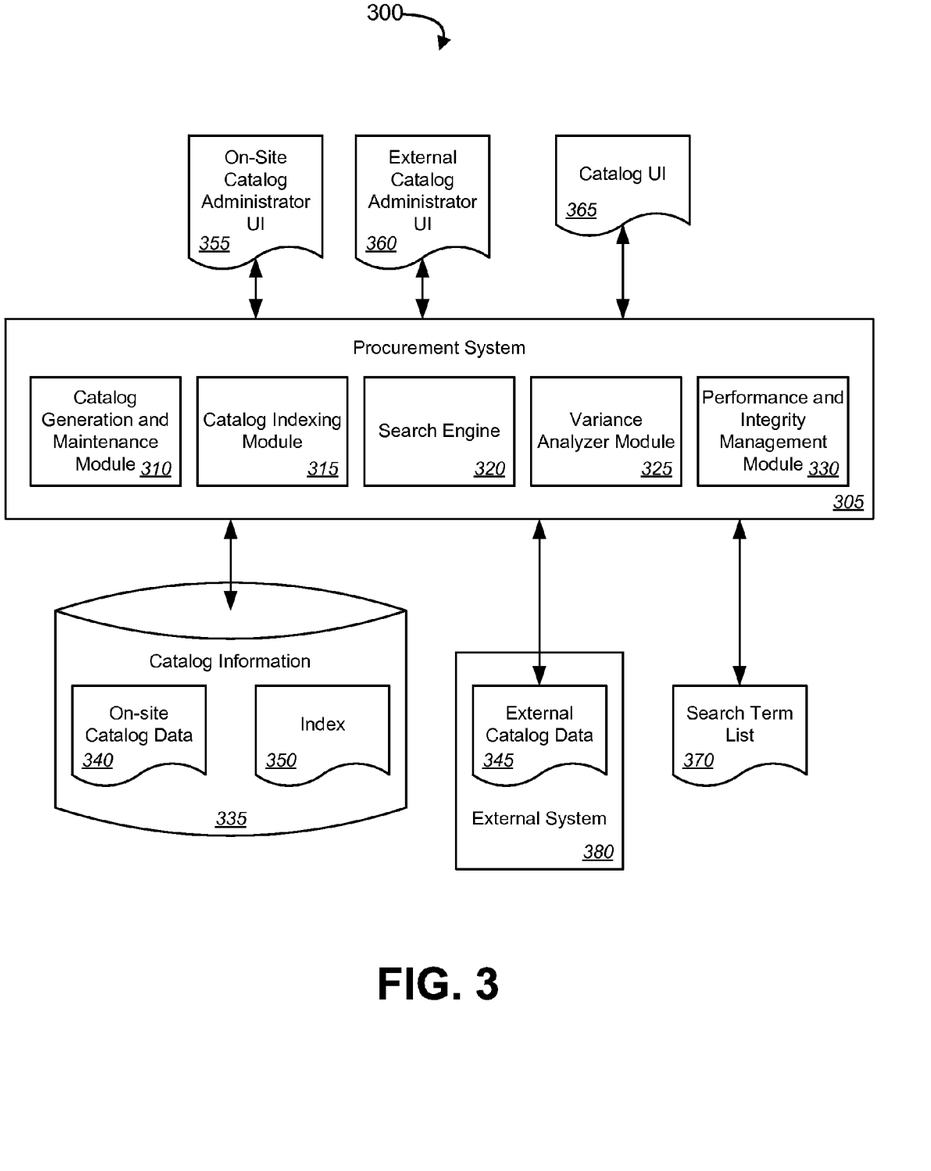
FIG. 3 is a block diagram illustrating, at a high-level, functional components of a system for managing catalog information according to one embodiment of the present invention.

FIG. 3 is a block diagram illustrating, at a high-level, functional components of a system for managing catalog information according to one embodiment of the present invention. As illustrated in this example, the system 300 can include a procurement system 305 such as any of the computer systems described above executing a procurement application such as an enterprise procurement application. As noted above, the procurement system can provide for managing catalog information 335 that can include onsite 340, i.e., for which records are maintained by the procurement system, as well as external product or service information 345, i.e., for which records are maintained by a system other than the procurement system such as a system of or operated by a supplier.

Generally speaking, an operator of the procurement system, such as an administrator accessing the procurement system 305 through an on-site catalog administrator user interface 355 to interact with a catalog generation and maintenance module 310 of the procurement system 305, can create externally hosted catalogs and links thereto for each externally hosted catalog supplier, and set up high level keywords so that information from the externally hosted catalogs can be returned, e.g., through a catalog user interface 365, if requesters execute a search using these keywords. For example, catalog managers can upload or assign through the on-site catalog administrator user interface 355 externally hosted catalog item level details, such as item description, manufacturer and manufacturer part number to an externally hosted catalog. On-site catalog information 340 can be stored in a set of catalog information 335 maintained by the procurement system 305.

For external items, i.e., catalog items for which records storing the item level information is maintained by the supplier or on another system other than the procurement system, a search index 350 can be generated by the catalog indexing module 315 and stored in the catalog information 335 of the procurement system 305. The index 350 can allow procurement application requesters to search for individual items that reside in an external catalog data 345 without having to navigate to, or access an external site, e.g., the site of the supplier, first. Therefore, requesters can, for example through the catalog user interface 365, perform one search query against products and services from both local and external sources, i.e., search on the internal records of the on-site catalog data 340 and on the index 350 for external records of the external catalog data 345. If the search query matches items from the externally hosted catalog search index 350, the externally hosted catalog search items can be returned in the catalog user interface 365 in the search results together with the content from the internal sources. Requester can see that the item he is looking for is on an externally hosted catalog, and can then access, e.g., be redirected to the system 380 hosting the external records 345, to complete the requisition creation. In some cases, externally hosted catalog search items can be added to a user's personal list (e.g., a favorites list). In such cases, the user can see this item in his list when he returns to the procurement system.

Stated another way, managing catalog information 335 in a procurement system 305 can begin with creating a catalog comprising records of a plurality of items. The records can comprise one or more internal records 340 maintained by the procurement system 305 as well as one or more external records 345 maintained by a system other than the procurement system 305. Information corresponding to each of the one or more external records can be stored in an index 350 of the externally hosted catalog. For example, the index can contain attributes for an item, such as but not limited to the description of the item, category, supplier, supplier item number, manufacturer, manufacturer part number. If a user searches in the procurement system with a search phrase that matches any of these attributes in the index, the item can be displayed to the user.

As the catalog is used by one or more users, for example through the catalog user interface 365, search terms for items of the externally hosted catalog can be received by the system 305. In response, a search can be performed by the search engine 320 of the procurement system 305 on the index 350 of the externally hosted catalog and the one or more internal records 340 to identify items of the plurality of items matching the search terms. Records corresponding to the identified items can be returned by the search engine 320 through the catalog user interface 365 based on searching the index 350 of the externally hosted catalog and the one or more internal records 340 for the search terms. For example, a list can be provided in the catalog user interface 365 of the returned records corresponding to the identified items. Depending upon the search results, the returned records can include external and internal records for items of the catalog. Upon selection of the at least one external record from the list through the catalog user interface 365, the selected external record 345 can be retrieved by the procurement system 305 from the supplier or other system or the user may be directed to the external system, e.g., by a link to the external record, and the item corresponding to the selected record can be added to a requisition by the procurement system 305.

According to one embodiment, the procurement system 305 can also provide an external catalog administrator user interface 360. Generally speaking, through the catalog administrator user interface 360 the procurement system 305 can allow suppliers to maintain the externally hosted catalog search items for an externally hosted catalog. By delegating the maintenance of the externally hosted catalog search items to the supplier, the buying organization will be able to specify if the supplier on an externally hosted catalog can perform uploads for that catalog, receive notifications when a supplier had performed an upload for an externally hosted catalog, review the content/updates uploaded by the supplier, approve/reject the updates from the supplier before changes take effect. This can provide for maintaining the integrity of the search index.

More specifically, after the buying organization and the supplier agree on the list of externally hosted catalog items and prices, the catalog administrator, through the on-site catalog administrator user interface 355 can create an externally hosted catalog containing information as described above. The catalog administrator can also enable the externally hosted catalog for the supplier to update the externally hosted catalog search items, i.e., external records represented in the index 350, through the external catalog administrator user interface 360. Using this interface 360, the supplier can access the list of externally hosted catalog catalogs that have been enabled for him to maintain indexed externally hosted catalog search items. The supplier can choose to upload search information and, after submitting an upload job, the catalog administrators can view, through the on-site catalog administrator user interface 355 the upload status to determine if the externally hosted catalog search items have been successfully loaded or if there are errors that need to be fixed. Validation can be performed on the items in an upload file to ensure data integrity. Uploaded data may also be transformed using supplier map sets that are predefined in the application, if applicable. The existing functionality, supplier map sets, is used to map supplier, supplier site, UOM and category values used externally to values that are used internally in the procurement system 305.

After errors are addressed, the supplier can submit the changes for the buying organization to review. The catalog administrator can receive a notification through the on-site catalog administrator user interface 355 indicating that an externally hosted catalog has been updated by the supplier. Through this interface, the catalog administrator can view new items added, items removed, items updated, etc. The catalog administrator can then approve/reject the changes through the on-site catalog administrator user interface 355. If approved, the changes can take effect and requestors with access to the catalog can see the changes when searching for items in the externally hosted catalog through the catalog user interface 365.

Stated another way, managing catalog information in a procurement system 305 can begin with an administrator interacting with the catalog generation and maintenance module 310 through the on-site catalog administrator user interface 355 to create a externally hosted catalog comprising records of a plurality of items. The records can comprise one or more internal records 340 maintained by the procurement system 305 as well as one or more external records 345 maintained by a system other than the procurement system 305. Information corresponding to each of the one or more external records 345 can be stored in an index 350 of the externally hosted catalog information 350.

After the externally hosted catalog has been established, an update can be received, for example through the external catalog administrator user interface 360, for one or more of the external records 345. A summary can be provided to the administrator through the on-site catalog administrator user interface 355 of a difference between the index information 350 and the update of the external record 345. This update of the external record 345 can be validated or not by the administrator through the on-site catalog administrator user interface 355. In response to unsuccessfully validating the update of the external record 345, the update of the external record 345 can be provided through the external catalog administrator user interface 360 for correction. In response to successfully validating the update of the external record 345, the index 350 of the externally hosted catalog information 335 can be updated accordingly to reflect the update of the external record 345.

As noted above, the procurement application of the procurement system 305 can support multiple sources of products and services available for users to create requisitions. These include products and services from internal sources or external sources. Processes and policies can be enforced systematically to enforce negotiated pricings for products and services from internal sources. However, the source of where the product or service comes from should not deter the users or administrators of the procurement system 305 from applying standards and processes to enforce negotiated prices. Rather, the source should be transparent, and customers can rely on the procurement enterprise application to perform price audits.

According to one embodiment, discrepancies in the negotiated price can be reported through on-site catalog administrator user interface 355 when an externally sourced externally hosted catalog item is added to a requisition. For example, the list of externally hosted catalog items and prices negotiated with a supplier can be maintained by way of the search index 350. As noted above, the index 350 information can be uploaded and maintained by the catalog administrator through on-site catalog administrator user interface 355. If pricing information is uploaded and the catalog administrator indicated that price audit checks should be performed, then prices returned from the externally hosted catalog supplier can be verified through variance analyzer module 325. The catalog administrator can also specify a price tolerance to determine when a price variance is considered an audit failure.

A price variance between the negotiated price (on the externally hosted catalog search index) and the price returned by the externally hosted catalog supplier can be indicated and stored. Storing the price difference captures the variance at the point when the price audit is performed. When the catalog administrator next logs into the on-site catalog administrator user interface 355, they can be presented with analytics such as the number of requisition lines with price audit failures by supplier and/or the total amount of price audit failures by supplier. For example, a total variance amount for a supplier can be determined as:

$$\Sigma_{n=1}^{n=k}(Quantity_n * Price\ Variance_n)$$

Where k is the total number of requisition lines with failed price audit checks. These two pieces of information can provide the catalog administrator with a picture of the external supplier's performance in terms of honoring the negotiated prices. The catalog administrator through the on-site catalog administrator user interface 355 can drill down on these analytics to view detailed requisition line level information, such as the item and the price variance.

Stated another way, a negotiated price can be received for each item stored in an external record 345 and a tolerance for a difference between the negotiated price for the item and an actual price of the item. The negotiated price for each item can be stored, for example in index 350. At a later point, for example during the adding to a requisition of an external item as described above, an actual price for an item stored in an external record 345 can be received. A price variance of the item from the negotiated price can be calculated by the variance analyzer module 325 and a determination can be made by the variance analyzer module 325 as to whether the price variance is within a predefined tolerance. The tolerance can be, for example, set for a particular catalog or all catalogs. In some cases, the tolerance can be zero. In response to determining that the price variance is not within the tolerance, the price variance amount can be stored in the requisition by the variance analyzer module 325, analytics for the price variance can be presented, for example in an overview page of the on-site catalog administrator user interface 355, and a follow-up with a supplier can be initiated by the variance analyzer module 325. For example, a message can be provided to an administrator to follow up with a supplier, a message can be sent to the supplier, a workflow can be started, etc.

Given the large number of products and services that can be requested via an enterprise procurement application, it is challenging for the catalog managers to ensure that the content available via a catalog search or catalog browse can be easily located by the requesters. Catalog managers also face the challenge of ensuring that the catalog content stays relevant and current as products and services change and the needs of the requesters evolve. By understanding what requesters are searching for and not finding, the catalog administrator can better manage their catalog content and also reduce overhead in managing requests and support calls as a result of requesters not locating their desired products and services.

According to one embodiment, to help catalog managers understand the search trends and what requesters are searching for, a list 370 of search phrases that returned no results can be maintained, for example by performance and integrity management module 330, and made available to the catalog managers, for example through on-site catalog administrator user interface 355. Administrators can review this information for each search request and decide if the catalog content needs to be modified either by adding new items or by updating existing item attributes to improve discoverability of the items. Therefore, a log or list 370 of unique search phrases in shopping pages, which returned no search result can be maintained by the performance and integrity management module 330. A count can be maintained to capture how many times a particular phrase was used for search within a specific time period. This count can be used to rank the frequency of the search phrases when presented in the on-site catalog administrator user interface 355. Search phrases that exceed a predefined time period can be purged.

Stated another way, searching the index 350 of the externally hosted catalog and/or the one or more internal records 340 by the performance and integrity management module 330 can further comprise determining whether one or more results of said searching are found. In response to determining one or more results of said searching are not found, a further determination can be made as to whether terms for said searching are unique relative to a list 370 of failed previous search terms. In response to determining the terms for said searching are not unique relative to the list 370 of failed previous search terms, a count can be incremented for an entry in the list 370 of failed previous search terms matching the terms for said searching. In response to determining the terms for said searching are unique relative to the list 370 of failed previous search terms, the terms for said searching can be added to the list 370 of failed previous search terms.

In some cases, the list 370 of failed previous search terms can be ranked based on the count of each entry of the list 370. The list 370 of failed previous search terms can be presented to an administrator or other user, for example through the on-site catalog administrator user interface 355. The presented list can be ordered, for example, based on said ranking. In some cases, one or more entries of the list 370 of failed previous search terms can be expired based on a pre-determined time period or otherwise periodically cleaned or purged.

Figure 4:
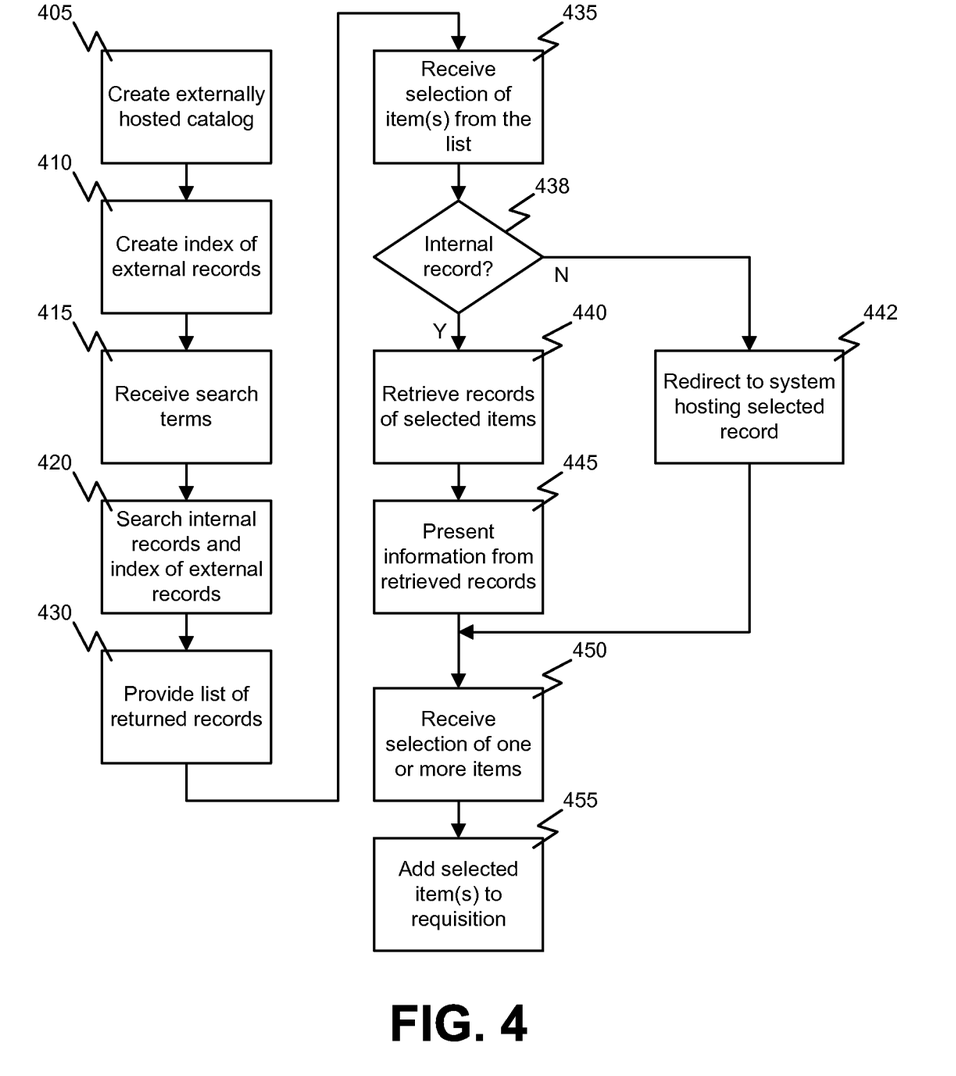
FIG. 4 is a flowchart illustrating a process for managing catalog information according to one embodiment of the present invention.

FIG. 4 is a flowchart illustrating a process for managing catalog information according to one embodiment of the present invention. In this example, managing catalog information in a procurement system can begin with creating 405 a catalog comprising records of a plurality of items. The records can comprise one or more internal records maintained by the procurement system as well as one or more external records maintained by a system other than the procurement system. Information corresponding to each of the one or more external records can be stored 410 in an index of the externally hosted catalog.

As the catalog is used by one or more users, search terms for items of the catalog can be received 415. In response, a search 420 can be performed on the index of the externally hosted catalog and the one or more internal records to identify items of the plurality of items matching the search terms. A list can be provided 430 of the returned records corresponding to the identified items. Depending upon the search results, the returned records can include external and internal records for items of the catalog.

Upon selection 435 of the at least one external record from the list, a determination 438 can be made as to whether the selected 435 record is an internal record or an external record. If the selected 435 record is an external record, the user can be redirected 442 to the system hosting the external record. If the selected 435 record is an internal record, the selected external record can be retrieved 440 from the system external to the procurement system and information from the retrieved external record can be presented 445 to the user. Upon a selection 450 of a record of the returned records, the item corresponding to the selected record can be added 455 to a requisition.

Figure 5:
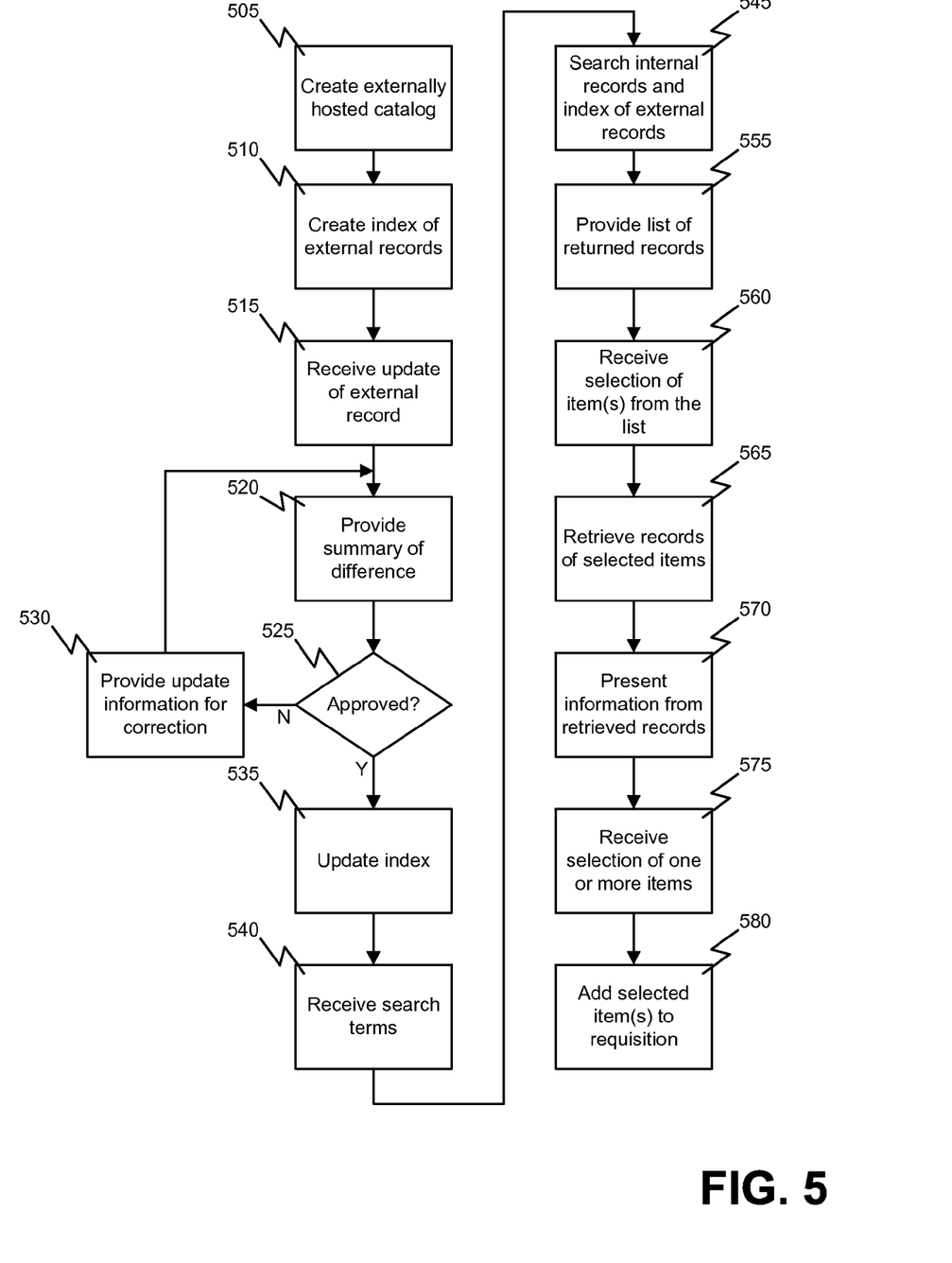
FIG. 5 is a flowchart illustrating a process for managing catalog information according to another embodiment of the present invention.

FIG. 5 is a flowchart illustrating a process for managing catalog information according to one embodiment of the present invention. In this example, managing catalog information in a procurement system can begin with creating 505 a catalog comprising records of a plurality of items. The records can comprise one or more internal records maintained by the procurement system as well as one or more external records maintained by a system other than the procurement system. Information corresponding to each of the one or more external records can be stored 510 in an index of the externally hosted catalog.

After the externally hosted catalog has been established, an update can be received 515 for one or more of the external records. A summary can be provided 520 of a difference between the external record and the update of the external record. This update of the external record can be validated 525. In response to unsuccessfully validating 525 the update of the external record, the update of the external record can be provided for correction. In response to successfully validating 525 the update of the external record, the externally hosted catalog can be updated 535 with the update of the external record.

As the catalog is used by one or more users, search terms for items of the externally hosted catalog can be received 540. In response, a search 545 can be performed on the index of the externally hosted catalog and the one or more internal records to identify items of the plurality of items matching the search terms. A list can be provided 555 of the returned records corresponding to the identified items. Depending upon the search results, the returned records can include external and internal records for items of the catalog. Upon selection 560 of the at least one external record from the list, the selected external record can be retrieved 565 from the system external to the procurement system and information from the retrieved external record can be presented 570 to the user. Upon a selection 575 of a record of the returned records, the item corresponding to the selected record can be added 580 to a requisition.

Figure 6:
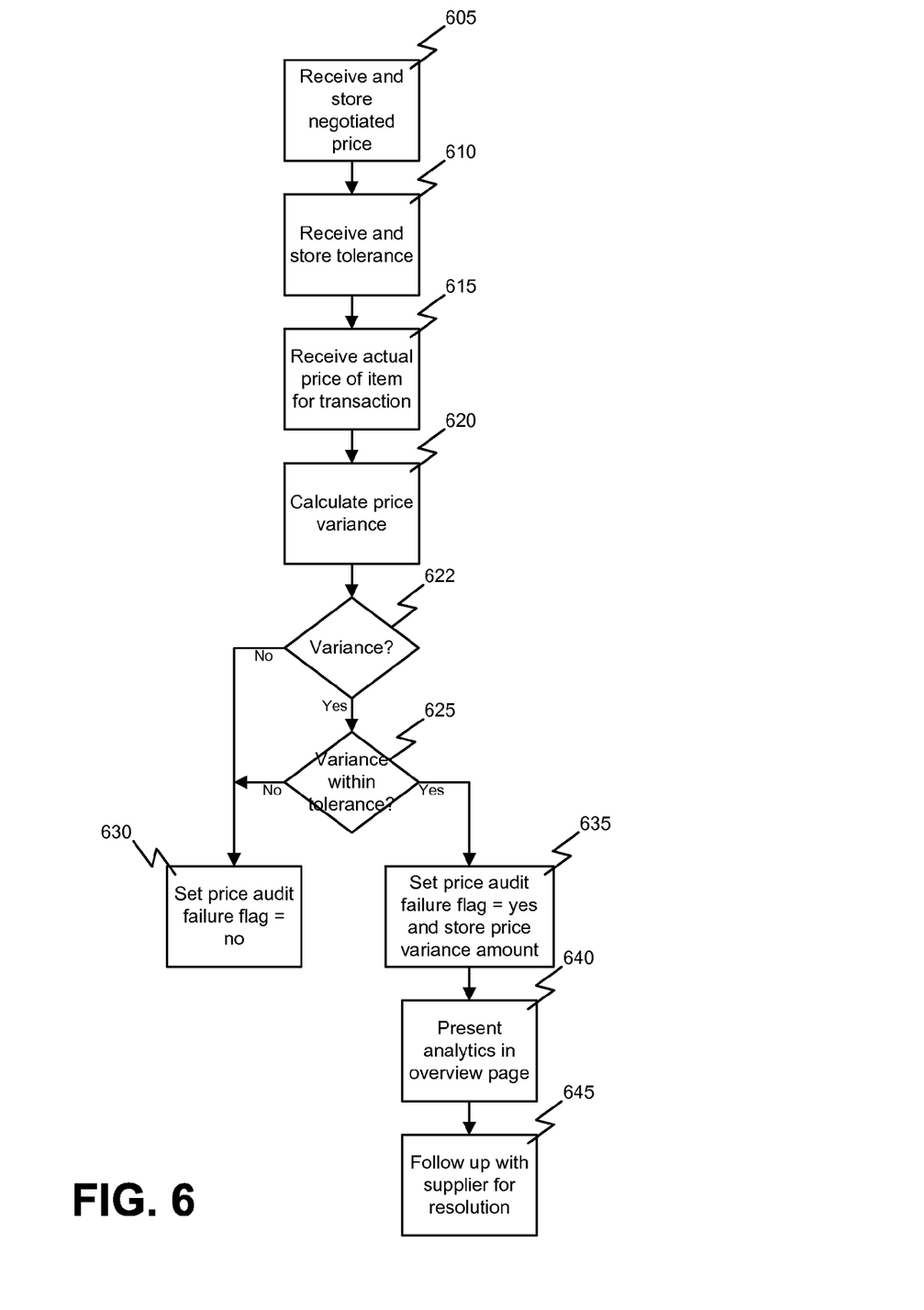
FIG. 6 is a flowchart illustrating a process for performing variance analysis of catalog information according to one embodiment of the present invention.

FIG. 6 is a flowchart illustrating a process for performing variance analysis of catalog information according to one embodiment of the present invention. For example, a negotiated price can be receiving 605 for each item stored in an external record and a tolerance for a difference between the negotiated price for the item and an actual price of the item. The negotiated price and the tolerance for each item can be stored 610. At a later point, for example during an update of an external item as described above, an actual price for an item stored in an external record can be received 615. A price variance of the item from the negotiated price can be calculated 620 and a determination 622 can be made as to whether there is a variance. In response to determining 622 there is a variance, a determination 625 can be made as to whether the price variance is within the tolerance. In response to determining 625 that the price variance is not within the tolerance, the price variance amount can be stored 635, analytics for the price variance can be presented 640, for example in an overview page, and a follow-up with a supplier can be initiated 645. However, in response to determining 622 there is no variance or determining 625 that the variance is within the tolerance, a price audit failure indication can be set to a false condition.

Figure 7:
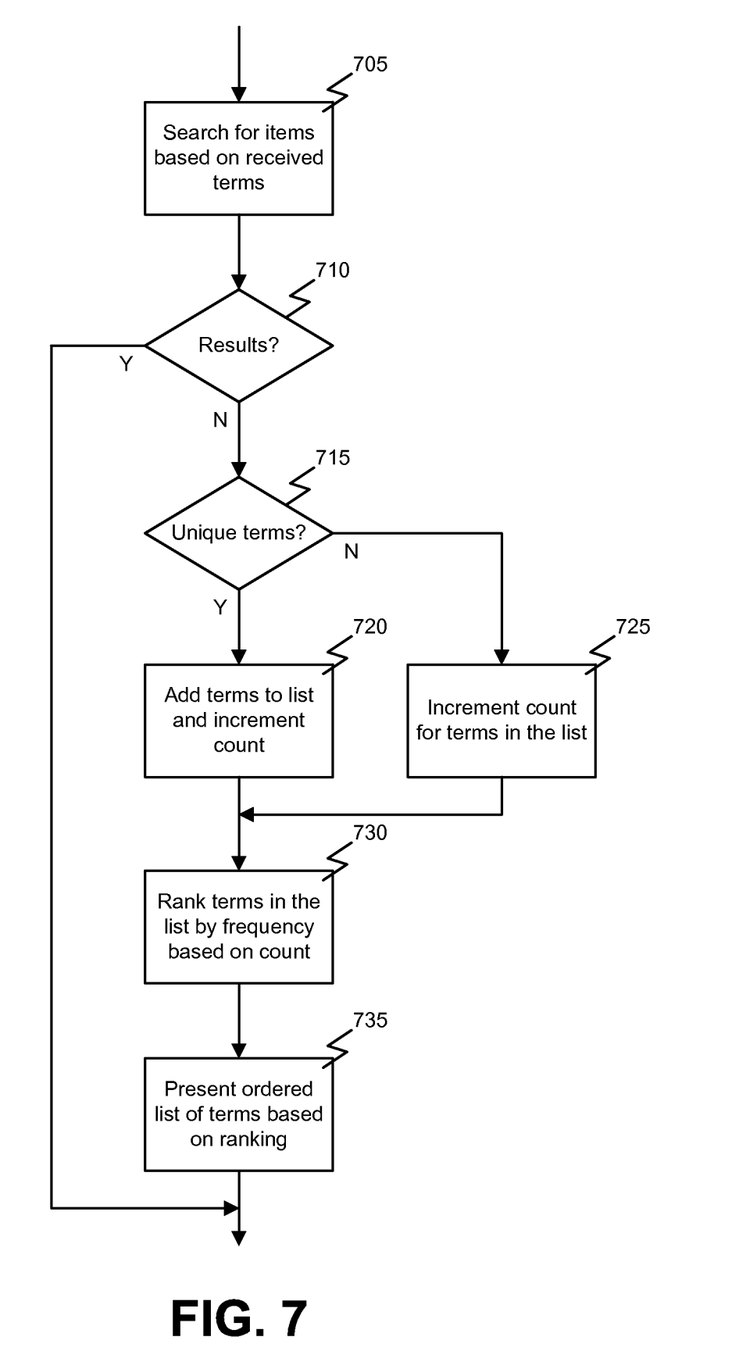
FIG. 7 is a flowchart illustrating a process for managing performance and integrity of catalog information according to one embodiment of the present invention.

FIG. 7 is a flowchart illustrating a process for managing performance and integrity of catalog information according to one embodiment of the present invention. For example, searching 705 the index of the externally hosted catalog and/or the one or more internal records can further comprises determining 710 whether one or more results of said search are found. In response to determining 710 if one or more results of said searching are not found, a further determination 715 can be made as to whether terms for said searching (i.e., the failed search terms) are unique relative to a list of failed previous search terms. In response to determining 715 the failed search terms are not unique relative to the list of failed previous search terms, a count can be incremented 725 for an entry in the list of failed previous search terms matching the terms for said searching. In response to determining 715 the terms for said searching are unique relative to the list of failed previous search terms, the terms for said searching can be added 720 to the list of failed previous search terms.

In some cases, the list of failed previous search terms can be ranked 730 based on the count of each entry of the list. The list of failed previous search terms can be presented 735 to an administrator or other user. The presented list can be ordered, for example, based on said ranking. In some cases, one or more entries of the list of failed previous search terms can be expired based on a pre-determined time period or otherwise periodically cleaned or purged.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of managing performance and integrity of catalog information in a procurement system, the method comprising:

maintaining, by a computer system, a catalog comprising records of a plurality of items, the plurality of items available for requisition through the procurement system;

receiving, by the computer system, a search request, the search request including one or more search terms for identifying items of the plurality of items;

performing, by the computer system, a search of the catalog based on the one or more search terms;

determining, by the computer system, whether one or more results of said searching are found;

in response to determining one or more results of said searching are not found, generating, by the computer system, records in a list of search terms for the terms of said searching that did not find one or more results, the list of search terms separate from the catalog, wherein generating records for the terms of said searching that did not find one or more results comprises determining whether terms for said searching are unique relative to a list of failed previous search terms;

in response to determining the terms for said searching are not unique relative to the list of failed previous search terms, incrementing, by the computer system, a count for an entry in the list of failed previous search terms matching the terms for said searching; and in response to determining the terms for said searching are unique relative to the list of failed previous search terms, adding, by the computer system, the terms for said searching to the list of failed previous search terms.

2. The method of claim 1, further comprising:

ranking, by the computer system, the list of failed previous search terms based on the count of each entry of the list; and presenting, by the computer system, the list of failed previous search terms, wherein the presented list is ordered based on said ranking.

3. The method of claim 1, further comprising expiring, by the computer system, one or more entries of the list of failed previous search terms based on a pre-determined time period.

4. A system comprising:

a processor; and a memory coupled with and readable by the processor and having stored therein a sequence of instructions which, when executed by the processor, cause the processor to manage performance and integrity of catalog information in a procurement system by maintaining a catalog comprising records of a plurality of items, the plurality of items available for requisition through the procurement system, receiving a search request, the search request including one or more search terms for identifying items of the plurality of items, performing a search of the catalog based on the one or more search terms, determining whether one or more results of said searching are found, in response to determining one or more results of said searching are not found, generating records in a list of search terms for the terms of said searching that did not find one or more results, the list of search terms separate from the catalog, wherein generating records for the terms of said searching that did not find one or more results comprises determining whether terms for said searching are unique relative to a list of failed previous search terms, in response to determining the terms for said searching are not unique relative to the list of failed previous search terms, incrementing a count for an entry in the list of failed previous search terms matching the terms for said searching, and in response to determining the terms for said searching are unique relative to the list of failed previous search terms, adding the terms for said searching to the list of failed previous search terms.

5. The system of claim 4, further comprising:

ranking the list of failed previous search terms based on the count of each entry of the list; and presenting the list of failed previous search terms, wherein the presented list is ordered based on said ranking.

6. The system of claim 4, further comprising expiring one or more entries of the list of failed previous search terms based on a pre-determined time period.

7. A computer-readable memory having stored therein a sequence of instructions which, when executed by a processor, cause the processor to manage performance and integrity of catalog information in a procurement system by:

maintaining a catalog comprising records of a plurality of items, the plurality of items available for requisition through the procurement system;

receiving a search request, the search request including one or more search terms for identifying items of the plurality of items;

performing a search of the catalog based on the one or more search terms;

determining whether one or more results of said searching are found;

in response to determining one or more results of said searching are not found, generating records in a list of search terms for the terms of said searching that did not find one or more results, the list of search terms separate from the catalog, wherein generating records for the terms of said searching that did not find one or more results comprises determining whether terms for said searching are unique relative to a list of failed previous search terms;

in response to determining the terms for said searching are not unique relative to the list of failed previous search terms, incrementing a count for an entry in the list of failed previous search terms matching the terms for said searching; and in response to determining the terms for said searching are unique relative to the list of failed previous search terms, adding the terms for said searching to the list of failed previous search terms.

8. The computer-readable memory of claim 7, further comprising:

ranking the list of failed previous search terms based on the count of each entry of the list; and presenting the list of failed previous search terms, wherein the presented list is ordered based on said ranking.

9. The computer-readable memory of claim 7, further comprising expiring one or more entries of the list of failed previous search terms based on a pre-determined time period.

* * * * *